Nov. 2, 1937.　　　C. T. FUETTERER　　　2,097,876
WATER SOFTENING METHOD
Filed Aug. 10, 1933
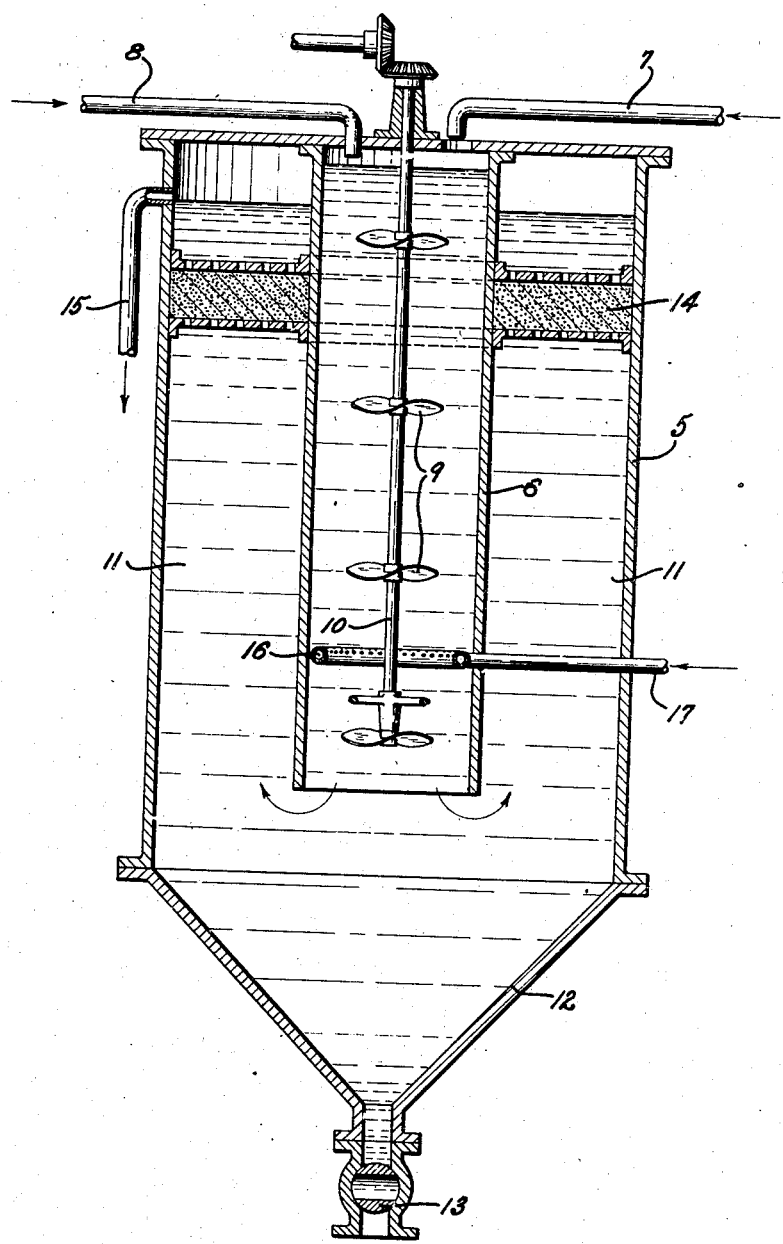
INVENTOR
CHARLES T. FUETTERER
BY
Brockett, Hyde, Higley & Meyer
ATTORNEYS Patented Nov. 2, 1937

2,097,876

UNITED STATES PATENT OFFICE 2,097,876

WATER SOFTENING METHOD

Charles T. Fuetterer, Akron, Ohio

Application August 10, 1933, Serial No. 684,535

5 Claims. (Cl. 210—16)

This invention relates to a method of softening water by the introduction of a catalytic agent which accelerates the reaction and increases the effectiveness of the usual softening agents.

The process of water softening consists in removing or reducing the suspended or colloidal matter, carbon dioxide, hydrogen sulphide, iron, aluminum, hydrogen, carbonate, bicarbonate, magnesium and calcium content of the water. Of these substances, the largest in quantity and those which it is generally most desirable to remove are calcium and magnesium; the former is precipitated with the presence of carbonate radicals and the latter with the presence of hydroxyl radicals. These precipitating radicals are generally added to the water in the form of lime as CaO or slaked as $Ca(OH)_2$, which furnishes the hydroxyl radicals, and soda ash $Na_2CO_3$, which furnishes the carbonate radicals. Other salts are sometimes necessary or desirable, such as sodium, potassium or barium salts to treat special conditions in the water, and my improved catalytic agent greatly aids the chemical action of any and all of these usual softening agents.

My catalytic agent comprises one or more organic compounds containing carbon, hydrogen, and oxygen which is introduced in the water softening process along with inorganic substances, such as the lime or one or more of various salts mentioned. The particular organic compound, or compounds introduced and the quantity and method of its introduction varies with the particular type of water treated.

The various advantages resulting from the use of my improved catalytic agent will be apparent to those skilled in the art, from the following description together with the drawing, in which the single figure represents a sectional view of a continuous cold water softener.

While my catalytic agent increases the efficiency of any water softening process and may be used with either the batch, continuous or semi-continuous processes whether cold or hot, I have chosen to illustrate my method as applied in a continuous cold water softener.

In the drawing I have shown a tank 5 having a central compartment 6 into which the raw water is introduced as through pipe 7 and the chemical reagents, such as lime, soda ash and various inorganic salts, pre-mixed and measured enter through pipe 8. These chemical softeners mix with the raw water and pass downwardly through the central compartment 6, such agitation being aided by impellers 9 on a shaft 10 which may be rotated by any suitable means not shown. The softened water passes out through the open bottom of the central compartment, then passes upwardly through the annular space 11 surrounding the central tube where sufficient time and reduced velocity allows the settlement of precipitates into the conical bottom 12 of the container 5. Such precipitates or sludge is intermittently drained off through the sludge valve 13. The softened water passing up through the space 11 may be filtered or not as desired, but I have shown it passing through a filter bed 14 of excelsior, wood-fiber, or other suitable substance and thereafter overflowing through the outlet 15.

It will be understood by those skilled in the art that mixing and metering devices must be provided for the softening chemicals and that ordinarily the raw water would be metered and preferably automatic control mechanism would be provided to proportion the added chemicals according to the rate at which the raw water was fed to the apparatus. I do not illustrate such auxiliary devices as they form no part of the present invention.

My improvement comprises the addition of an organic compound containing carbon, hydrogen and oxygen, such as carbohydrates or alcohols, or a mixture thereof as a catalytic agent to hasten and intensify the action of the ordinary softening agents. The method of introducing these compounds and the form and quantity in which they are introduced is not fixed but, as is the usual case with other methods of treating water, what is applicable to one particular type of water is not applicable to another type.

It is customary in working out methods of water treatment to make preliminary calculations and estimates as to the quantity and method of introduction of reagents which are to be added and such calculations and estimates are generally checked by preliminary experiments to determine practically whether the proper solution has been found. I determine the manner of introducing the organic catalytic agent and the quantity thereof in a similar manner that is, by making preliminary calculations and estimates and checking it in preliminary experimental tests. I have found that the organic catalytic agent may be introduced in the form of alcohols, sugars, starches and similar substances. Sometimes one of the carbohydrates will give good results. With another type of water a mixture of one or more carbohydrates will give the best results.

With some types of water, the catalytic agent may be introduced with the chemicals entering the central tube through pipe 8 or through a separate pipe if desired, but in other cases, better results are obtained by introducing it later in the treating process by means of a suitable device in the lower portion of tube 6, such as the perforated ring 16 supplied through a conduit 17 leading outside container 5.

The quantity of the organic catalytic agent introduced in any given process will depend upon the water treated but I have found that a water containing 40 grains of combined calcium and magnesium may be very satisfactorily treated with the addition of 1½ to 2 pounds lime and 2½ to 3 pounds sodium carbonate per thousand gallons of raw water, and a catalytic agent in amounts ranging up to 20% of the lime charge, preferably from 5% to 20%.

This weight of catalytic agent is made up of 5 to 30 per cent of one or more organic compounds containing carbon, hydrogen and oxygen, such as carbohydrates, and 95 to 70 per cent of one or more inorganic salts, such as the sodium, potassium, or barium compounds mentioned above as are found necessary to meet certain special conditions in each water treated. Thus, the carbohydrate may be based on the lime charge (calculated in the known manner) and will run from somewhat less than one per cent to about 6 per cent thereof by weight. In the specific case mentioned the carbohydrate would be about six-hundredths of a pound per thousand gallons of raw water treated. This will soften and clarify the above water down to 2 or 3 grains total hardness in a space of from 15 to 60 minutes without the use of any excess heat.

While the exact nature of the action of any catalytic agent is still somewhat uncertain, it seems to increase the ionization of the calcium oxide or calcium hydrate so that the latter perform their function in the elimination of calcium and magnesium salts much more rapidly. I also find that this rapid reaction induced by the catalytic agent combined with the lime ions also greatly aids the ionization of soda ash or sodium carbonate and that the reactions of these ions are greatly increased in many cases.

It results from my improved process that the water softening reactions are more rapid and complete than is possible without the use of my improved catalytic agent. In cold process work, I have been able to reduce the time of treatment to approximately 20 or 30 per cent of the former time required for satisfactory reaction and settling. In hot process work, I have been able to reduce the time from 40 to 50 per cent of the time formerly required to get a complete reaction and settling.

Another advantage of my improved method results from the production of very heavy precipitates which settle out rapidly and this gives a very clear effluent in a much shorter space of time than the standard practices with lime or lime and soda ash usually produce when used to soften water. This rapid reaction and settling is an advantage in that it requires less time, less equipment and usually a saving in chemicals required to properly soften the water.

While I have described my invention as being particularly adapted for the softening of water, it may also be utilized for other purposes such as for the clarification or purification of sewage, or for the purification or clarification of industrial waste of all kinds.

What I claim is:

1. The method of conditioning water which comprises treating the water with lime in the presence of a small amount of a catalytic agent comprising a carbohydrate which is at least partially soluble in water in the presence of lime, the carbohydrate being present in an amount ranging from more than incidental impurities up to approximately 6% of the lime charge.

2. The method of conditioning water which comprises treating the water with lime and sodium carbonate in the presence of a catalytic agent comprising a compound selected from a group consisting of sugar, starch and a water soluble alcohol, the selected compound being present in an amount ranging from more than incidental impurities up to approximately 6% of the lime charge.

3. The method of conditioning water which comprises treating the water with lime and sodium carbonate in the presence of a small amount of a catalytic agent comprising a carbohydrate which is at least partially soluble in water in the presence of lime, said carbohydrate being present in an amount ranging from more than incidental impurities up to approximately 6% of the lime charge.

4. The method of conditioning water which comprises treating the water with lime in the presence of a catalytic agent comprising a carbohydrate which is at least partially soluble in water in the presence of lime, and a compound selected from a group of inorganic compounds consisting of sodium compounds and potassium compounds which are soluble in water and which react with impurities in the water to form an insoluble precipitate, said catalytic agent being present in an amount ranging from more than incidental impurities up to approximately six per cent of the lime charge.

5. The method of conditioning water which comprises treating the water with lime in the presence of a catalytic agent selected from a group consisting of sugar, starch and a water soluble alcohol, and a compound selected from a group of inorganic compounds consisting of sodium compounds and potassium compounds which are soluble in water and which react with impurities in the water to form an insoluble precipitate, said catalytic agent being present in an amount ranging from more than incidental impurities up to approximately six per cent of the lime charge.

CHARLES T. FUETTERER.